(12) United States Patent
Ashikawa

(10) Patent No.: US 9,419,557 B2
(45) Date of Patent: Aug. 16, 2016

(54) MOTOR CONTROL DEVICE, IMAGE FORMING APPARATUS, AND MOTOR CONTROL METHOD

(71) Applicant: Masahiro Ashikawa, Kanagawa (JP)

(72) Inventor: Masahiro Ashikawa, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 14/252,728

(22) Filed: Apr. 14, 2014

(65) Prior Publication Data

US 2014/0306633 A1   Oct. 16, 2014

(30) Foreign Application Priority Data

Apr. 16, 2013 (JP) ................................ 2013-086052
Mar. 10, 2014 (JP) ................................ 2014-046959

(51) Int. Cl.
*H02P 21/00* (2016.01)
*H02P 29/00* (2016.01)
*G03G 15/00* (2006.01)

(52) U.S. Cl.
CPC ........ *H02P 29/0005* (2013.01); *G03G 15/5004* (2013.01); *G03G 15/55* (2013.01)

(58) Field of Classification Search
CPC ............. H02J 1/00; H02M 1/00; B60L 11/18; G01R 1/00

See application file for complete search history.

(56) References Cited

U.S. PATENT DOCUMENTS

| | | | | |
|---|---|---|---|---|
| 5,412,295 | A * | 5/1995 | Maruyama | G05B 23/0256 318/434 |
| 5,994,790 | A * | 11/1999 | Nagashima | H02H 3/087 307/10.1 |
| 2007/0262513 | A1* | 11/2007 | Fukusaka | B65H 3/48 271/98 |
| 2008/0219682 | A1* | 9/2008 | Yamasaki | G03G 15/5058 399/16 |
| 2009/0079999 | A1 | 3/2009 | Suzuki | |
| 2009/0153091 | A1* | 6/2009 | Tsujimoto | G05B 13/0245 318/561 |
| 2010/0086320 | A1* | 4/2010 | Koizumi | G03G 15/0872 399/30 |

FOREIGN PATENT DOCUMENTS

| | | |
|---|---|---|
| JP | 2886606 | 2/1999 |
| JP | 2009-078376 | 4/2009 |
| JP | 2010-284924 | 12/2010 |

* cited by examiner

*Primary Examiner* — Shawki S Ismail
*Assistant Examiner* — Zoheb Imtiaz
(74) *Attorney, Agent, or Firm* — Duft Bornsen & Fettig LLP

(57) ABSTRACT

A motor control device includes a measuring unit configured to output a measurement value corresponding to a rotation speed of a motor; and a control unit configured to control driving of the motor such that the measurement value makes closer to a target value. When the measurement value does not exceed a predetermined abnormality determination threshold, the control unit controls the driving of the motor based on a difference between the measurement value and the target value. The abnormality determination threshold is set in a positive direction or in a negative direction with reference to the target value. When the measurement value exceeds the abnormality determination threshold, the control unit controls the driving of the motor based on a difference between a corrected measurement value and the target value. The corrected measurement value is set in the same direction as the direction in which the abnormality determination threshold is set.

7 Claims, 9 Drawing Sheets

MOTOR CONTROL DEVICE, IMAGE FORMING APPARATUS, AND MOTOR CONTROL METHOD

CROSS-REFERENCE TO RELATED APPLICATIONS

The present application claims priority to and incorporates by reference the entire contents of Japanese Patent Application No. 2013-086052 filed in Japan on Apr. 16, 2013 and Japanese Patent Application No. 2014-046959 filed in Japan on Mar. 10, 2014.

BACKGROUND OF THE INVENTION

1. Field of the Invention

The present invention relates to a motor control device, an image forming apparatus, and a motor control method.

2. Description of the Related Art

In order to keep a rotation speed of a motor to a target speed, known has been a technique of measuring a period of a pulse signal that is output from an encoder in synchronization with rotation of the motor and performing feedback control such that the pulse period is closer to the target period corresponding to the target speed. There is the following concern for this technique. That is, when noise is superimposed on the pulse signal that is output from the encoder or when a phenomenon called chattering is generated, a measured pulse period is shorter than an actual period corresponding to the motor rotation speed, and stable control cannot be performed. In order to cope with this, proposed has been also a technique in which when the measured pulse period is shorter than a predetermined period, the measured pulse period is made invalid and feedback control is performed based on a previously measured pulse period (for example, see Japanese Patent No. 2886606).

In the technique as described in Japanese Patent No. 2886606, even when the previously measured pulse period is long and the currently measured pulse period is shorter than the predetermined period, feedback control is performed based on the previously measured pulse period. The control is performed in the above-mentioned manner even when the motor rotation speed is increased and the measured pulse period is shorter actually. Due to this, the motor rotation speed is controlled to be further increased, resulting in a problem that control stability is undermined.

Therefore, there is a need for a motor control device, an image forming apparatus, and a motor control method that are able of controlling a motor stably.

SUMMARY OF THE INVENTION

According to an embodiment, a motor control device includes a measuring unit configured to output a measurement value corresponding to a rotation speed of a motor; and a control unit configured to control driving of the motor such that the measurement value makes closer to a target value. When the measurement value does not exceed a predetermined abnormality determination threshold, the control unit controls the driving of the motor based on a difference between the measurement value and the target value. The abnormality determination threshold is set in a positive direction or in a negative direction with reference to the target value. When the measurement value exceeds the abnormality determination threshold, the control unit controls the driving of the motor based on a difference between a corrected measurement value and the target value. The corrected measurement value is set in the same direction as the direction in which the abnormality determination threshold is set.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Hereinafter, embodiments of a motor control device, an image forming apparatus, and a motor control method according to the present invention are described in detail with reference to the accompanying drawings. The following describes a tandem color copying machine of an intermediate transfer system as an example of the image forming apparatus to which the present invention can be applied.

Figure 1:
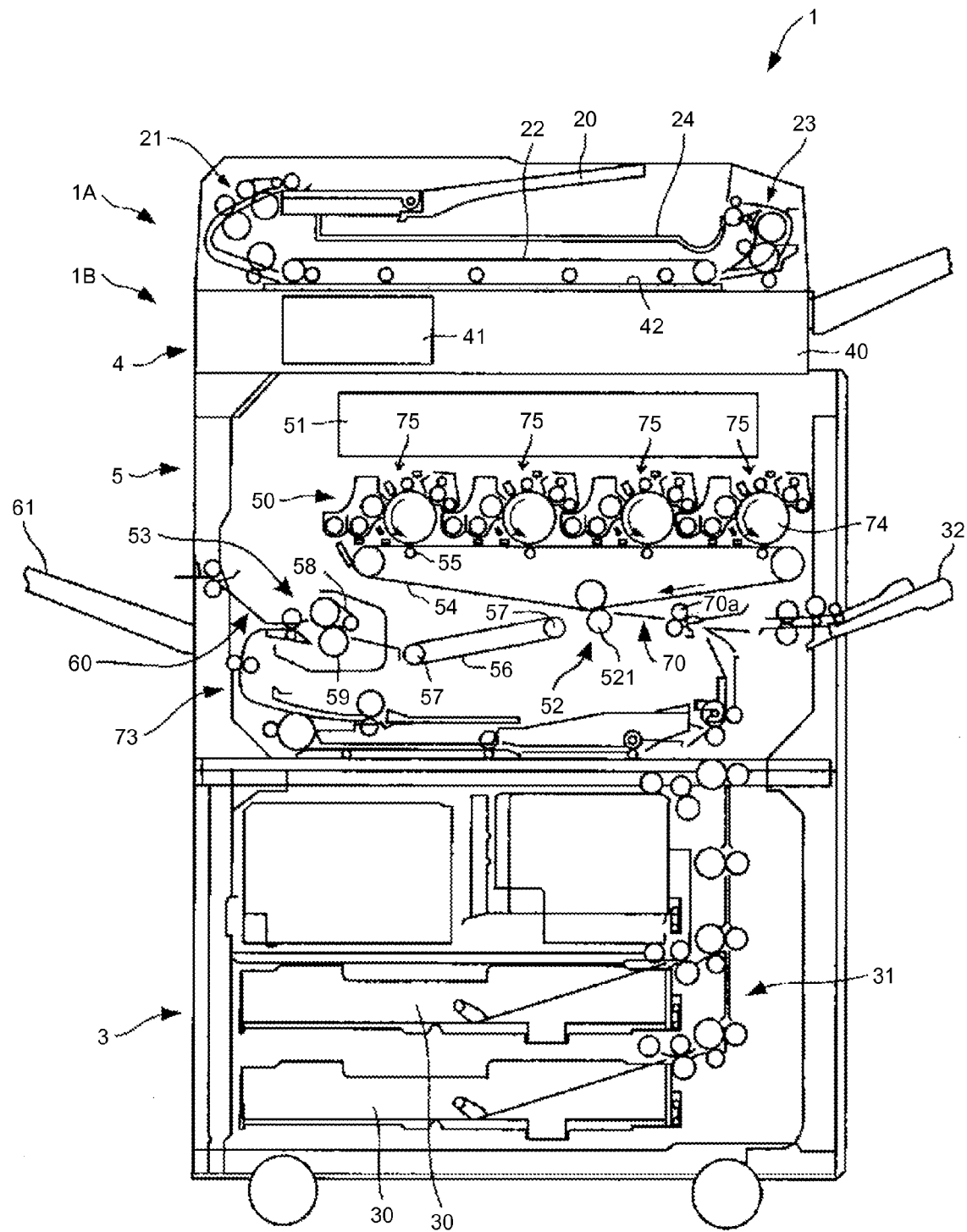
FIG. 1 is a schematic configuration view illustrating an image forming apparatus according to an embodiment.

FIG. 1 is a schematic configuration view illustrating an image forming apparatus 1 according to an embodiment. As illustrated in FIG. 1, the image forming apparatus 1 includes an auto document feeder (ADF) 1A and an apparatus main body 1B. The apparatus main body 1B is constituted by a paper feeding unit 3, an image reading unit 4, and an image forming unit 5.

The ADF 1A includes a document tray 20, a document feeding roller 21, a document carriage belt 22, a document discharging roller 23, and a document discharge tray 24. The ADF 1A is attached to the image reading unit 4 so as to be opened and closed through an opening/closing mechanism (not illustrated) such as a hinge.

The document feeding roller 21 separates a document (not illustrated) from a document bundle placed on the document tray 20 one by one to convey it to the image reading unit 4. The document carriage belt 22 conveys the document separated by the document feeding roller 21 to the image reading unit 4. The document discharging roller 23 discharges the document that is discharged from the image reading unit 4 by the document carriage belt 22 to the document discharge tray 24 under the document tray 20.

The image reading unit 4 includes a housing 40, an optical scanning unit 41, a contact glass 42, and a driving unit (not illustrated). The optical scanning unit 41 is provided in the housing 40 and includes a light emitting diode (LED) unit. The optical scanning unit 41 irradiates the document with light in the main-scanning direction from the LED unit and scans the document in the whole irradiation region in the sub-scanning direction by the driving unit. With this, the optical scanning unit 41 reads a two-dimensional color image on the document.

The contact glass 42 is provided above the housing 40 of the image reading unit 4 and configures an upper surface portion of the housing 40. The driving unit includes a wire (not illustrated) fixed to the optical scanning unit 41, a plurality of driven pulleys (not illustrated) and a driving pulley (not illustrated) around which the wire is wound, and a motor for rotating the driving pulley.

The paper feeding unit 3 includes paper cassettes 30 and a feeding unit 31. The paper cassettes 30 accommodate sheets of paper (not illustrated) as recording media having different paper sizes. The feeding unit 31 conveys the paper accommodated in the paper cassette 30 to a main conveying path 70 of the image forming unit 5.

A bypass tray 32 is arranged on the side surface of the image forming unit 5 so as to be opened and closed with respect to the image forming unit 5. A paper bundle is set on the tray upper surface in a state where the bypass tray 32 is opened with respect to the image forming unit 5. The uppermost paper of the set paper bundle is fed to the main conveying path 70 by a feed-out roller of the bypass tray 32.

A pair of registration rollers 70a are arranged on the main conveying path 70. The pair of registration rollers 70a nip the paper that is conveyed through the main conveying path 70 between the rollers, and then, feeds the paper toward a secondary transfer nip at a predetermined timing.

The image forming unit 5 includes an exposing unit 51, a tandem image forming unit 50, an intermediate transfer belt 54, intermediate transfer rollers 55, a secondary transfer device 52, and a fixing unit 53, for example. Furthermore, the image forming unit 5 includes the main conveying path 70, a reverse conveying path 73, and a discharging path 60, for example.

As illustrated in FIG. 1, the exposing unit 51 is arranged so as to be adjacent to the tandem image forming unit 50. The exposing unit 51 exposes photosensitive drums 74 to light. The photosensitive drums 74 are provided so as to correspond to respective colors of yellow, cyan, magenta, and black.

The tandem image forming unit 50 is constituted by four image forming units 75 for yellow, cyan, magenta, and black that are arranged on the intermediate transfer belt 54 along the rotating direction of the intermediate transfer belt 54. Although detail illustration is omitted, the respective image forming units 75 include charging devices, developing devices, photosensitive-element cleaning devices, and neutralization devices around the photosensitive drums 74 provided for the above-mentioned respective colors. Each photosensitive drum 74 and the above-mentioned respective devices provided around it are unitized to constitute one process cartridge.

The tandem image forming unit 50 forms visible images (toner images) with toners of the respective colors on the photosensitive drums 74 based on image information that has been read by the image reading unit 4 and exploded into the respective colors. The visible images formed on the respective photosensitive drums 74 are transferred onto the intermediate transfer belt 54 between the respective photosensitive drums 74 and the intermediate transfer rollers 55.

On the other hand, the secondary transfer device 52 is provided at the side opposite to the tandem image forming unit 50 with the intermediate transfer belt 54 interposed therebetween. The secondary transfer device 52 includes a secondary transfer roller 521 as a transfer member. The secondary transfer roller 521 is pressed against the intermediate transfer belt 54 so as to form the secondary transfer nip. The toner images formed on the intermediate transfer belt 54 are transferred onto the paper conveyed through the main conveying path 70 from the paper feeding unit 3 on the secondary transfer nip.

The paper onto which the toner images have been transferred on the secondary transfer nip is fed to the fixing unit 53 by a paper carriage belt 56 wound around two supporting rollers 57.

A pressing roller 59 is pressed against a fixing belt 58 as an endless belt so as to constitute the fixing unit 53. The fixing unit 53 applies heat and pressure to the paper by the pressing roller 59 so as to melt the toners on the toner images transferred onto the paper and fix a color image onto the paper.

The paper onto which the color image has been fixed in the above-mentioned manner is stacked on an external discharge tray 61 through the discharging path 60 as a discharge conveying path.

As illustrated in FIG. 1, the reverse conveying path 73 is provided under the secondary transfer device 52 and the fixing unit 53. The reverse conveying path 73 reverses the front and rear sides of the paper discharged from the fixing unit 53 and supplies the paper to the secondary transfer device 52 through the main conveying path 70 again in order to form images on both the sides of the paper.

Paper detecting sensors (not illustrated) as a plurality of paper jam detecting units are arranged on the main conveying path 70 and the reverse conveying path 73 along the conveying paths. The number and arrangement places of the paper detecting sensors are set appropriately. When each paper detecting sensor does not detect passage of the paper within predetermined time, it grasps occurrence of paper jam and notifies a display unit (not illustrated) and the like of the image forming apparatus 1 of the occurrence of the jam.

The image forming apparatus 1 configured as described above is provided with motors required to rotate at constant speeds for forming an image appropriately. Examples of the motors include a motor for driving the photosensitive drums 74, a motor for driving the intermediate transfer belt 54, and a motor for driving the paper carriage belt 56. Furthermore, the image forming apparatus 1 includes a motor control device for controlling driving of the motors that are used for image formation to rotate at constant speeds by means of feedback control. The following describes a specific example of a motor control device 100 included in the image forming apparatus 1 according to the embodiment.

Figure 2:
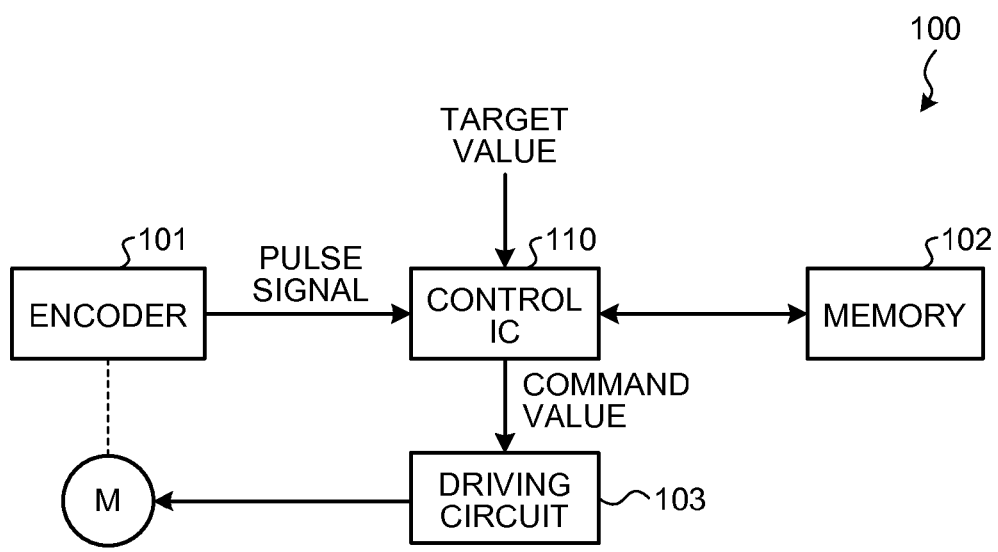
FIG. 2 is a schematic configuration diagram illustrating a motor control device included in the image forming apparatus.

FIG. 2 is a schematic configuration diagram illustrating the motor control device 100 included in the image forming apparatus 1 in the embodiment. As illustrated in FIG. 2, the motor control device 100 includes an encoder 101, a control integrated circuit (IC) 110, a memory 102, and a driving circuit 103.

The encoder 101 outputs a pulse signal in synchronization with rotation of a motor M that is used for image formation. As the encoder 101, a rotary encoder including an encoder wheel and a sensor can be used. The encoder wheel is provided coaxially with a rotating shaft of the motor M that is used for image formation and rotates integrally with the rotating shaft. The sensor receives light from a light source that passes through slits of the encoder wheel. The pulse signal that is output from the encoder 101 is input to the control IC 110.

The control IC 110 measures a period of the pulse signal (hereinafter, referred to as "pulse period") that is output from the encoder 101, generates a command value for controlling driving of the motor M such that the pulse period is closer to a target value (target period) corresponding to a target speed of the motor M, and outputs it to the driving circuit 103. The memory 102 temporarily stores therein information that is used for processing by the control IC 110.

The driving circuit 103 drives the motor M in accordance with the command value that is output from the control IC 110.

Figure 3:
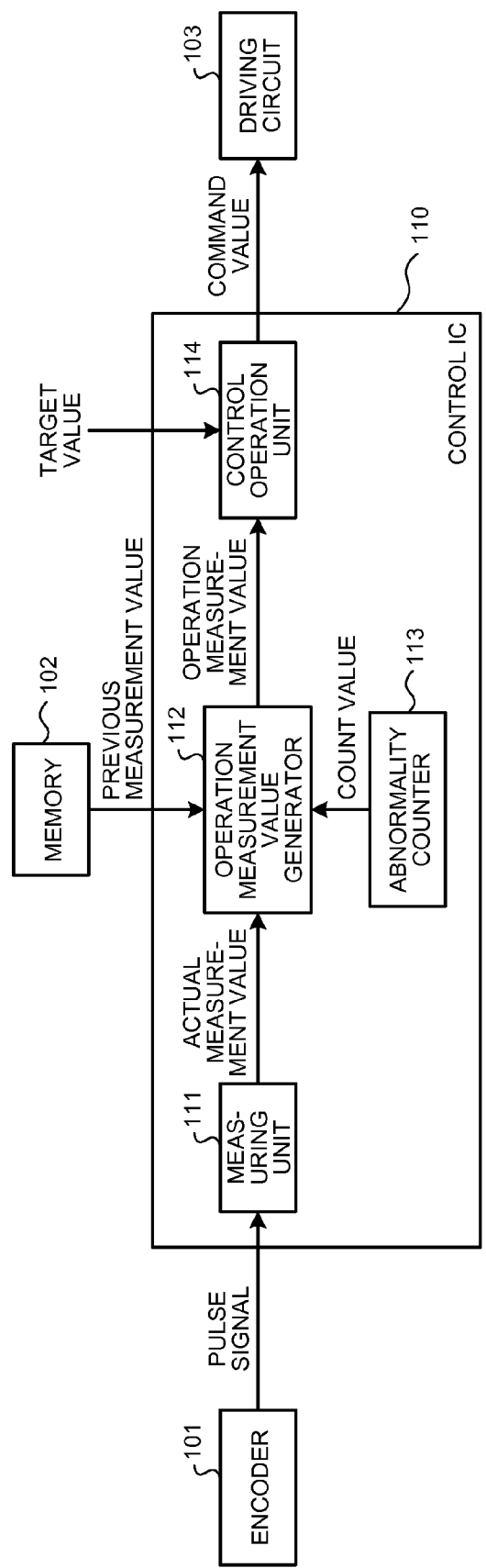
FIG. 3 is a block diagram illustrating an example of the functional configuration of a control IC.

FIG. 3 is a block diagram illustrating an example of the functional configuration of the control IC 110. As illustrated in FIG. 3, the control IC 110 includes, as functional constituent components, a measuring unit 111, an operation measurement value generator 112, an abnormality counter 113, and a control operation unit 114.

The measuring unit 111 inputs the pulse signal from the encoder 101 and measures a pulse period at a predetermined constant time interval (hereinafter, referred to as "control cycle"). The pulse period measured by the measuring unit 111 at each control cycle is input to the operation measurement value generator 112. The pulse period that is input to the operation measurement value generator 112 from the measuring unit 111 at each control cycle is a value corresponding to the current rotation speed of the motor M unless abnormality due to superimposition of noise or a phenomenon called chattering occurs. Hereinafter, the pulse period that is input to the operation measurement value generator 112 from the measuring unit 111 at each control cycle is referred to as an "actual measurement value".

The operation measurement value generator 112 compares the actual measurement value input from the measuring unit 111 with a predetermined abnormality determination threshold which is set in a positive direction or in a negative direction with reference to the target value. The operation measurement value generator 112 then generates and outputs a measurement value (hereinafter, referred to as "operation measurement value") that is used for an operation by the control operation unit 114 based on the comparison result.

To be specific, when the actual measurement value does not exceed the abnormality determination threshold, the operation measurement value generator 112 outputs the actual measurement value as it is as the operation measurement value. It should be noted that the abnormality determination threshold is assumed to be set as a lower limit threshold lower than the target value. In this case, when the actual measurement value is lower than the lower limit threshold which is set in the negative direction with reference to the target value, the operation measurement value generator 112 determines that the actual measurement value exceeds the abnormality determination threshold. On the other hand, when the actual measurement value is equal to or higher than the lower limit threshold, the operation measurement value generator 112 determines that the actual measurement value does not exceed the abnormality determination threshold.

When the operation measurement value generator 112 outputs the actual measurement value as it is as the operation measurement value because the actual measurement value does not exceed the abnormality determination threshold, it writes the actual measurement value into the memory 102 and rewrites (updates) the past actual measurement value that has been already written into the memory 102.

When the actual measurement value exceeds the abnormality determination threshold, the operation measurement value generator 112 determines whether a count value of the abnormality counter 113 reaches a certain number of times (for example, three times). The abnormality counter 113 counts the number of times that the actual measurement value exceeds the abnormality determination threshold successively, and increments the count value every time the actual measurement value exceeds the abnormality determination threshold successively. When the actual measurement value that does not exceed the abnormality determination threshold is input to the operation measurement value generator 112, the count value of the abnormality counter 113 is reset.

When the actual measurement value exceeds the abnormality determination threshold, the operation measurement value generator 112 outputs, as the operation measurement value, the past actual measurement value stored in the memory 102, that is, the actual measurement value (hereinafter, referred to as "previous measurement value") measured immediately before the actual measured value exceeds the abnormality determination threshold until the count value of the abnormality counter 113 reaches the certain number of times. Then, when the count value of the abnormality counter 113 reaches the certain number of times, the operation measurement value generator 112 outputs a corrected measurement value as the operation measurement value.

When the target value is considered as a reference, the corrected measurement value is set in the same direction as the direction in which the abnormality determination threshold used at a time when the latest abnormality has been determined is set. That is to say, when the abnormality determination threshold is set as the lower limit threshold that is lower than the target value (i.e., the lower limit threshold is set in the negative direction with respect to the target value) and the latest abnormality is determined based on the lower limit threshold, the corrected measurement value is set to a value lower than the target value (i.e., the corrected measurement value is set in the negative direction with respect to the target value). Furthermore, when the abnormality determination threshold is set as an upper limit threshold that is higher than the target value (i.e., the upper limit threshold is set in the positive direction with respect to the target value) and the latest abnormality is determined based on the upper limit threshold, the corrected measurement value is set to a value higher than the target value (i.e., the corrected measurement value is set in the positive direction with respect to the target value). It is sufficient that a value to be used as the corrected measurement value, among values in the same direction as the direction in which the abnormality determination threshold is set, is defined previously. For example, the abnormality determination threshold itself can be used as the corrected measurement value or a predefined value around the abnormality determination threshold can be also used as the corrected measurement value. A range of values in which they can be used as the corrected measurement value is approximately 0 to a value that is three times as the abnormality determination threshold. Within this range, an actual measurement value that exceeds the abnormality determination threshold can be also used as the corrected measurement value.

The control operation unit 114 calculates a command value for controlling driving of the motor M such that the rotation speed of the motor M is closer to the target speed (that is, the pulse period is closer to the target value) based on the difference between the target value corresponding to the target speed of the motor M and the operation measurement value that is output from the operation measurement value generator 112.

Next, operations of the motor control device 100 in the embodiment that is configured as described above are described while comparing with the case where control with the existing technique is performed. The following describes the case where the actual measurement value that is higher than the target value at a control cycle C0 becomes lower than the lower limit threshold set as the abnormality determination threshold at a subsequent control cycle C1 due to drastic change in the speed of the motor M (increase in the rotation speed) as an example.

Figure 4:
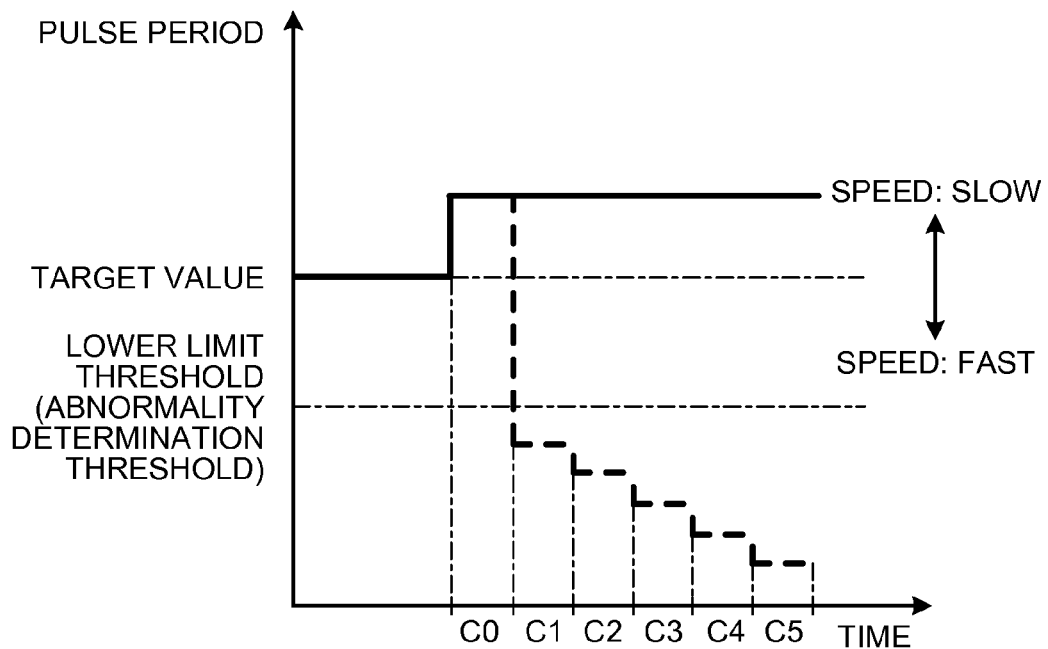
FIG. 4 is a graph illustrating time change of an operation measurement value according to a comparison example.

FIG. 4 is a graph illustrating time change of the operation measurement value when control with the existing technique is performed in the above-mentioned scene (comparison example). The graph as indicated by a dashed line in FIG. 4 indicates the time change of the actual measurement value and the graph as indicated by a solid line in FIG. 4 indicates the time change of the operation measurement value. The longitudinal axis in FIG. 4 indicates the length of the pulse period and the lateral axis indicates time.

As illustrated in FIG. 4, in the comparison example, when the actual measurement value measured at the control cycle C1 is lower than the lower limit threshold (exceeds the abnormality determination threshold) due to the drastic change in the speed of the motor M, the previous measurement value measured at the previous control cycle C0, that is, the previous measurement value higher than the target value is output as the operation measurement value. As a result, the command value calculated based on the difference between the target value and the operation measurement value is a command value for further increasing the speed of the motor M, and the actual measurement value that is measured at a subsequent control cycle C2 is also lower than the lower limit threshold. In the same manner at the control cycle C2, the previous measurement value measured at the control cycle C0 is output as the operation measurement value, and a command value for further increasing the speed of the motor M is calculated.

In the comparison example, thereafter, the previous measurement value measured at the control cycle C0 is continuously output as the operation measurement value as long as the actual measurement value is lower than the lower limit threshold. With this, the command values that are calculated based on the differences between the target value and the operation measurement values also correspond to command values for further increasing the speed of the motor M at subsequent control cycles C3, C4, C5, . . . . This fails to make the speed of the motor M closer to the target speed.

Figure 5:
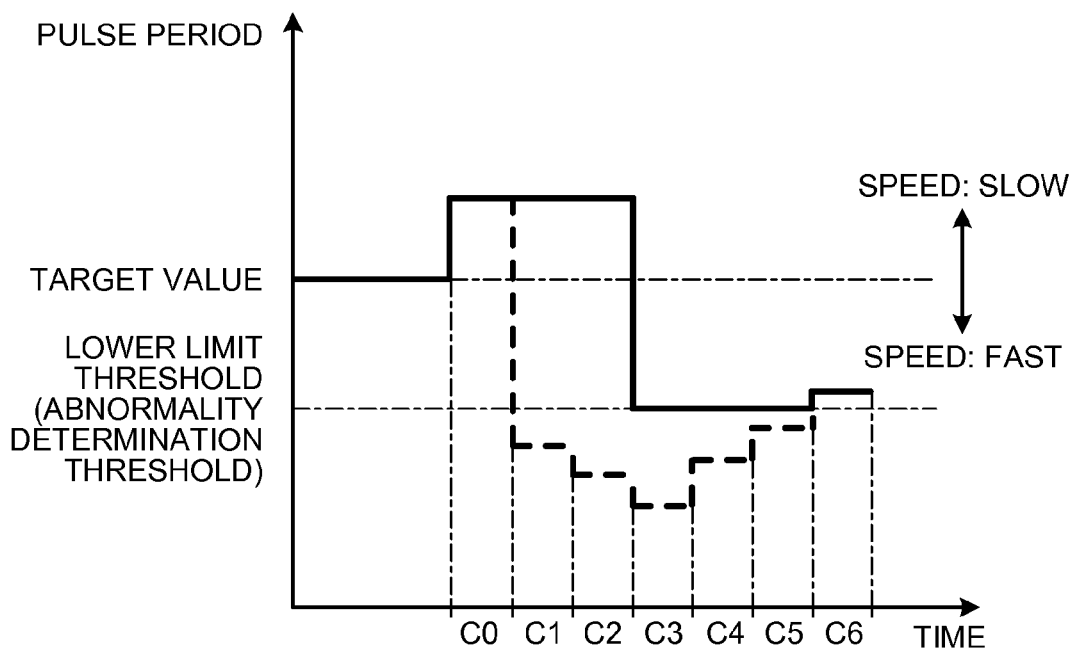
FIG. 5 is a graph illustrating time change of an operation measurement value that is output from an operation measurement value generator of the motor control device.

FIG. 5 is a graph illustrating time change of the operation measurement value that is output from the operation measurement value generator 112 of the motor control device 100 according to the embodiment in the above-mentioned scene. Although the lower limit threshold itself set as the abnormality determination threshold is used as the corrected measurement value in FIG. 5, the corrected measurement value may not be the lower limit threshold as described above. As in FIG. 4, the graph as indicated by a dashed line in FIG. 5 indicates the time change of the actual measurement value and the graph as indicated by a solid line in FIG. 5 indicates the time change of the operation measurement value. The longitudinal axis in FIG. 5 indicates the length of the pulse period and the lateral axis indicates time.

As illustrated in FIG. 5, in the motor control device 100 according to the embodiment, when the actual measurement value measured at the control cycle C1 is lower than the lower limit threshold (exceeds the abnormality determination threshold) due to the drastic change in the speed of the motor M, the operation measurement value generator 112 outputs the previous measurement value measured at the previous control cycle C0 as the operation measurement value. In this case, the count value of the abnormality counter 113 is incremented.

Thereafter, as in the case of the comparison example, the actual measurement values at the control cycle C2 and the control cycle C3 are lower than the lower limit threshold. In the motor control device 100 according to the embodiment, the abnormality counter 113 increments the count value every time the actual measurement value is lower than the lower limit threshold. Then, the operation measurement value generator 112 outputs the previous measurement value measured at the control cycle C0 as the operation measurement value until the count value of the abnormality counter 113 reaches a certain number of times (three times in the example of FIG. 5). When the count value of the abnormality counter 113 reaches the certain number of times, the operation measurement value generator 112 outputs, as the operation measurement value, the corrected measurement value (in this example, lower limit threshold set as the abnormality determination threshold) lower than the target value.

In the example of FIG. 5, at the control cycle C2, the count value of the abnormality counter 113 is twice and does not reach three times as the certain number of times, so that the operation measurement value generator 112 outputs the previous measurement value measured at the control cycle C0 as the operation measurement value. At the subsequent control cycle C3, the count value of the abnormality counter 113 reaches three times as the certain number of times, so that the operation measurement value generator 112 outputs the corrected measurement value (lower limit threshold) as the operation measurement value. The corrected measurement value is a value lower than the target value. Accordingly, when the corrected measurement value is output as the operation measurement value, the command value that is calculated based on the difference between the target value and the operation measurement value is a command value for decreasing the speed of the motor M.

Thereafter, although the actual measurement values at the control cycle C4 and the control cycle C5 are lower than the lower limit threshold, the operation measurement value generator 112 outputs the corrected measurement value (lower limit threshold) as the operation measurement value because the count value of the abnormality counter 113 has already reached three times. As a result, the command value for decreasing the speed of the motor M is continuously input to the driving circuit 103. With this, the actual measurement value gradually makes closer to the target value. Then, the actual measurement value is equal to or higher than the lower limit threshold at a control cycle C6, so that the operation measurement value generator 112 outputs the actual measurement value as the operation measurement value and resets the count value of the abnormality counter 113. Thereafter, the command value is calculated based on the difference between the target value and the actual measurement value, and the speed of the motor M converges to the target speed.

Figure 6:
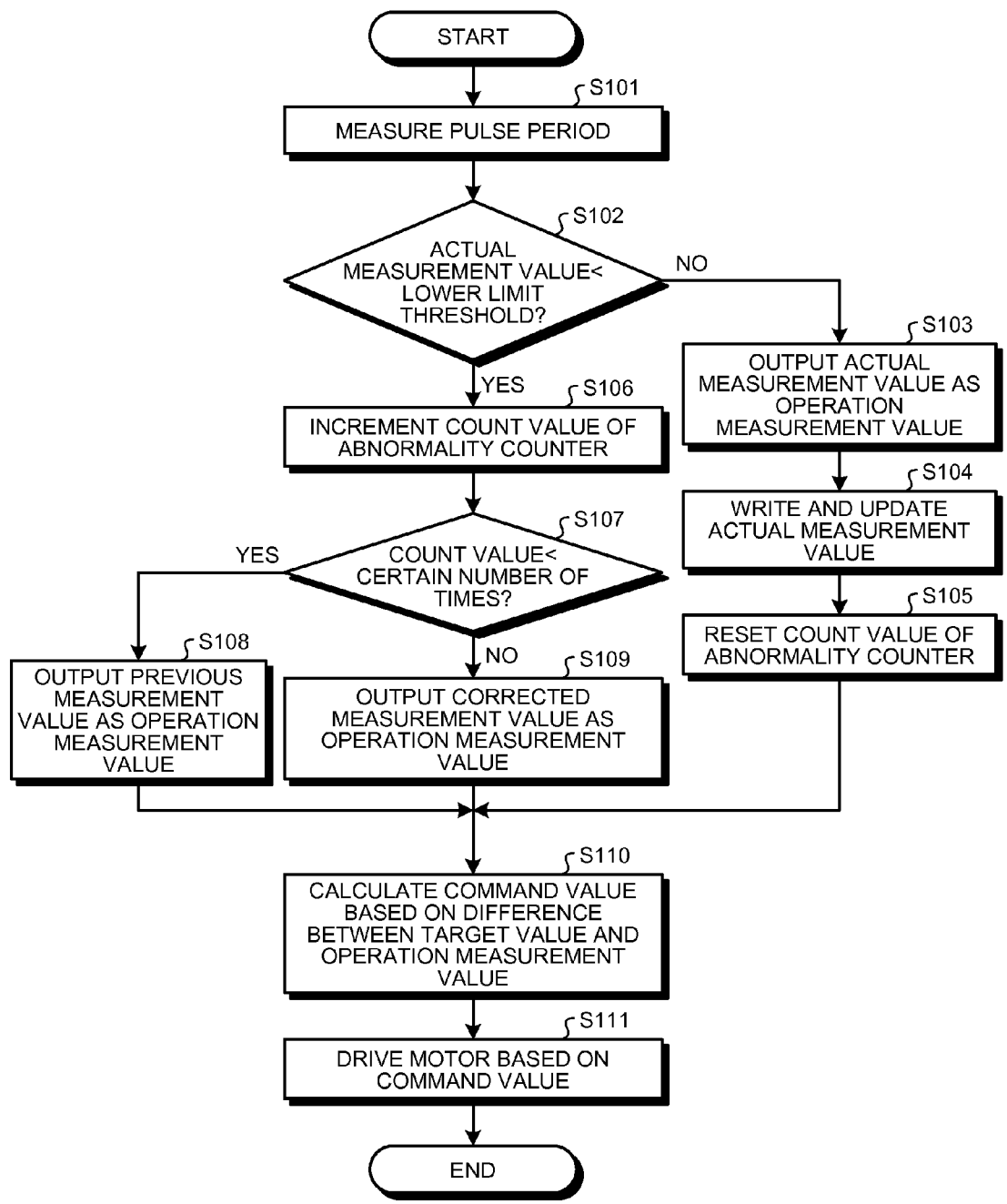
FIG. 6 is a flowchart illustrating control procedures of the motor control device.

Next, control procedures performed by the motor control device 100 in the embodiment are described with reference to FIG. 6. FIG. 6 is a flowchart illustrating the control procedures performed by the motor control device 100. A series of processes as illustrated in the flowchart in FIG. 6 are executed in the respective control cycles repeatedly.

When the process is started, first, the measuring unit 111 of the control IC 110 measures a period (pulse period) of a pulse signal that is output from the encoder 101 (step S101). The pulse period measured by the measuring unit 111 is input to the operation measurement value generator 112 as an actual measurement value.

Then, the operation measurement value generator 112 determines whether the actual measurement value input from the measuring unit 111 is lower than a lower limit threshold set as an abnormality determination threshold (step S102). If the actual measurement value is equal to or higher than the lower limit threshold (No at step S102), the operation measurement value generator 112 outputs the actual measurement value as an operation measurement value (step S103). Thereafter, the operation measurement value generator 112 writes the actual measurement value into the memory 102 and updates the previous measurement value stored in the memory 102 by the new actual measurement value (step S104). Furthermore, the operation measurement value generator 112 resets the count value of the abnormality counter 113 (step S105), and the process proceeds to step S110.

On the other hand, if the actual measurement value is determined to be lower than the lower limit threshold at step S102 (Yes at step S102), the operation measurement value generator 112 increments the count value of the abnormality counter 113 (step S106), and then, determines whether the count value is smaller than the certain number of times (step S107). If the count value of the abnormality counter 113 is smaller than the certain number of times (Yes at step S107), the operation measurement value generator 112 outputs the previous measurement value stored in the memory 102 as an operation measurement value (step S108), and the process proceeds to step S110. On the other hand, if the count value of the abnormality counter 113 reaches the certain number of times (No at step S107), the operation measurement value generator 112 outputs the corrected measurement value as an operation measurement value (step S109), and the process proceeds to step S110.

Subsequently, the control operation unit 114 calculates a command value for controlling driving of the motor M based on the different between the target value corresponding to the target speed of the motor M and the operation measurement value that is output from the operation measurement value generator 112 at step S103, step S108, or step S109 (step S110). Then, the driving circuit 103 drives the motor M based on the command value from the control operation unit 114 (step S111), and a series of processes in this control cycle are finished.

As described in detail above using the specific example, when the actual measurement value exceeds the abnormality determination threshold which is set in a positive direction or in a negative direction with respect to the target value, and calculates a command value for controlling driving of the motor M based on the difference between the target value and the operation measurement value, the motor control device 100 according to the embodiment sets, as the operation measurement value, the corrected measurement value set in the same direction as the direction in which the abnormality determination threshold is set and calculates a command value for controlling driving of the motor M based on the difference between the target value and the operation measured value. Accordingly, even when the drastic change in the speed of the motor M occurs, a disadvantage that the motor M is mistakenly controlled to be away from the target speed based on the previous measurement value can be prevented, whereby the motor M can be controlled stably.

The motor control device 100 according to the embodiment sets, as the operation measurement value, the previous measurement value stored in the memory 102 until the number of times that the actual measurement value exceeds the abnormality determination threshold successively reaches the certain number of times. When the number of times that the actual measurement value exceeds the abnormality determination threshold successively reaches the certain number of times, the motor control device 100 according to the embodiment sets the corrected measurement value as the operation measurement value. Then, the motor control device 100 according to the embodiment calculates a command value for controlling driving of the motor M based on the difference between the target value and the operation measurement value. Accordingly, even when the drastic change in the speed of the motor M occurs, the motor M can be controlled stably while suppressing the control abnormality due to noise and chattering effectively.

The image forming apparatus 1 according to the embodiment includes the motor control device 100 having the above-mentioned configuration. With this, the image forming apparatus 1 can form a high-quality image appropriately because the motor M required to rotate at a constant speed is controlled stably therein.

FIRST MODIFICATION

In the above description, the lower limit threshold lower than the target value is set as the abnormality determination threshold in order to remove influence by chattering and noise superimposed on the pulse signal that is output from the encoder 101. Examples of the abnormality of the pulse signal can also include abnormality called pulse missing that a pulse is not output temporarily due to sensor malfunction or the like of the encoder 101 in addition to the noise superimposition and the chattering. For coping with this, the following describes, as a first modification, the example in which the motor M is controlled stably while suppressing the control abnormality due to the pulse missing.

When the pulse missing occurs, the pulse period is largely beyond the target value. In the first modification, an upper limit threshold that is higher than the target value is set as the abnormality determination threshold. When the actual measurement value is higher than the upper limit threshold, the operation measurement value generator 112 of the control IC 110 determines that the actual measurement value exceeds the abnormality determination threshold. On the other hand, when the actual measurement value is equal to or lower than the upper limit threshold, the operation measurement value generator 112 of the control IC 110 determines that the actual measurement value does not exceed the abnormality determination threshold. It should be noted that the configuration and the basic control method of the motor control device 100 are the same as those in the above-mentioned embodiment.

The operations of the motor control device 100 in the first modification are described while comparing with the case where control with the existing technique is performed. The following describes the case where the actual measurement value that is lower than the target value at a control cycle C0 becomes higher than the upper limit threshold set as the abnormality determination threshold at a subsequent control cycle C1 due to drastic change in the speed of the motor M (decrease in the rotation speed) as an example.

Figure 7:
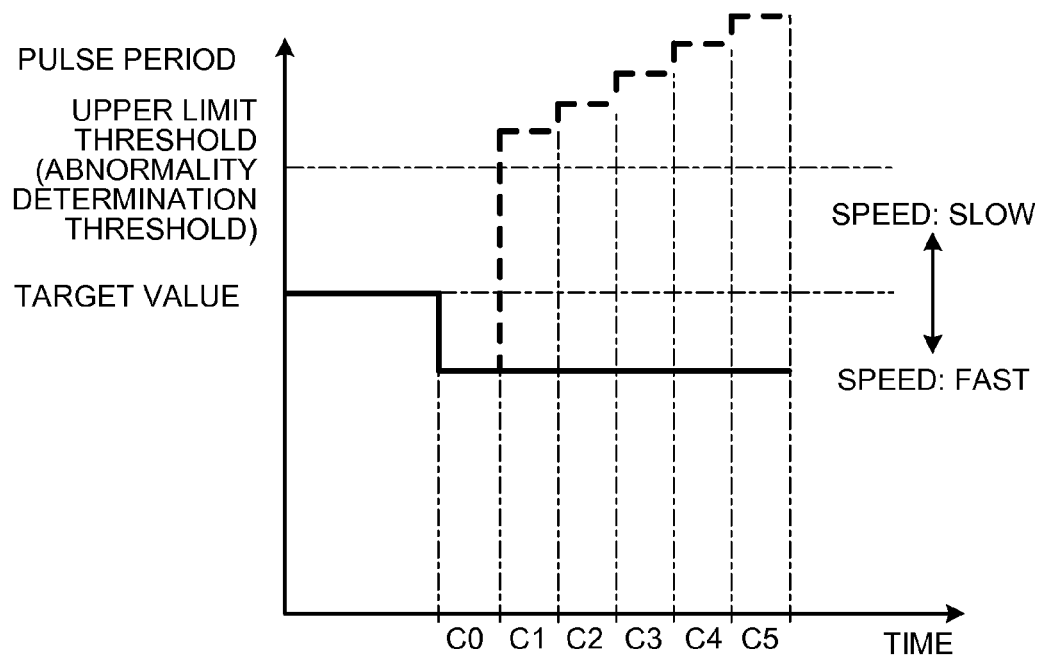
FIG. 7 is a graph illustrating time change of an operation measurement value according to another comparison example.

FIG. 7 is a graph illustrating time change of the operation measurement value when control with the existing technique is performed in the above-mentioned scene (comparison example). The graph as indicated by a dashed line in FIG. 7 indicates the time change of the actual measurement value and the graph as indicated by a solid line in FIG. 7 indicates the time change of the operation measurement value. The longitudinal axis in FIG. 7 indicates the length of the pulse period and the lateral axis indicates time.

As illustrated in FIG. 7, in the comparison example, when the actual measurement value measured at the control cycle C1 is higher than the upper limit threshold (exceeds the abnormality determination threshold) due to the drastic change in the speed of the motor M, the previous measurement value measured at the previous control cycle C0, that is, the previous measurement value lower than the target value is output as the operation measurement value. As a result, the command value calculated based on the difference between the target value and the operation measurement value is a command value for further decreasing the speed of the motor M, and the actual measurement value that is measured at a subsequent control cycle C2 is also higher than the upper limit threshold. In the same manner at the control cycle C2, the previous measurement value measured at the control cycle C0 is output as the operation measurement value, and a command value for further decreasing the speed of the motor M is calculated.

In the comparison example, thereafter, the previous measurement value measured at the control cycle C0 is continuously output as the operation measurement value as long as the actual measurement value is higher than the upper limit threshold. With this, the command value that is calculated based on the difference between the target value and the operation measurement value correspond to command value for further decreasing the speed of the motor M at each of subsequent control cycles C3, C4, C5, . . . . This fails to make the speed of the motor M closer to the target speed.

Figure 8:
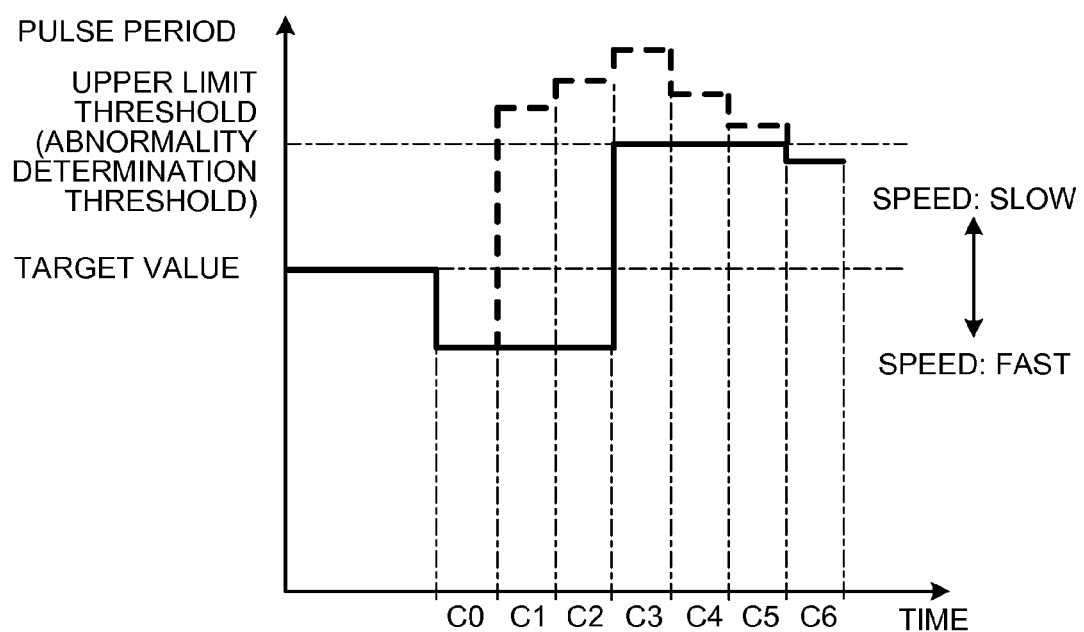
FIG. 8 is a graph illustrating time change of an operation measurement value that is output from an operation measurement value generator of a motor control device according to a first variation.

FIG. 8 is a graph illustrating time change of the operation measurement value that is output from the operation measurement value generator 112 of the motor control device 100 in the first modification in the above-mentioned scene. Although the upper limit threshold itself set as the abnormality determination threshold is used as the corrected measurement value in FIG. 8, the corrected measurement value may not be the upper limit threshold itself as described above. As in FIG. 7, the graph as indicated by a dashed line in FIG. 8 indicates the time change of the actual measurement value and the graph as indicated by a solid line in FIG. 8 indicates the time change of the operation measurement value. The longitudinal axis in FIG. 8 indicates the length of the pulse period and the lateral axis indicates time.

As illustrated in FIG. 8, in the motor control device 100 in the first modification, when the actual measurement value measured at the control cycle C1 is higher than the upper limit threshold (exceeds the abnormality determination threshold) due to the drastic change in the speed of the motor M, the operation measurement value generator 112 outputs the previous measurement value measured at the previous control cycle C0 as the operation measurement value. In this case, the count value of the abnormality counter 113 is incremented.

Thereafter, as in the case of the comparison example, the actual measurement values at the control cycle C2 and the control cycle C3 are higher than the upper limit threshold. In the motor control device 100 in the first modification, the abnormality counter 113 increments the count value every time the actual measurement value is higher than the upper limit threshold. Then, the operation measurement value generator 112 outputs the previous measurement value measured at the control cycle C0 as the operation measurement value until the count value of the abnormality counter 113 reaches a certain number of times (three times in the example of FIG. 8). When the count value of the abnormality counter 113 reaches the certain number of times, the operation measurement value generator 112 outputs, as the operation measurement value, the corrected measurement value (in this example, upper limit threshold set as the abnormality determination threshold) higher than the target value.

In the example of FIG. 8, at the control cycle C2, the count value of the abnormality counter 113 is twice and does not reach three times as the certain number of times, so that the operation measurement value generator 112 outputs the previous measurement value measured at the control cycle C0 as the operation measurement value. At the subsequent control cycle C3, the count value of the abnormality counter 113 reaches three times as the certain number of times, so that the operation measurement value generator 112 outputs the corrected measurement value (upper limit threshold) as the operation measurement value. The corrected measurement value is a value higher than the target value. Accordingly, when the corrected measurement value is output as the operation measurement value, the command value that is calculated based on the difference between the target value and the operation measurement value is a command value for increasing the speed of the motor M.

Thereafter, although the actual measurement values at the control cycle C4 and the control cycle C5 are higher than the upper limit threshold, the operation measurement value generator 112 outputs the corrected measurement value (upper limit threshold) as the operation measurement value because the count value of the abnormality counter 113 has already reached three times. As a result, the command value for increasing the speed of the motor M is continuously input to the driving circuit 103. With this, the actual measurement value gradually makes closer to the target value. Then, the actual measurement value is equal to or lower than the upper limit threshold at the control cycle C6, so that the operation measurement value generator 112 outputs the actual measurement value as the operation measurement value and resets the count value of the abnormality counter 113. Thereafter, the command value is calculated based on the difference between the target value and the actual measurement value, and the speed of the motor M converges to the target speed.

Figure 9:
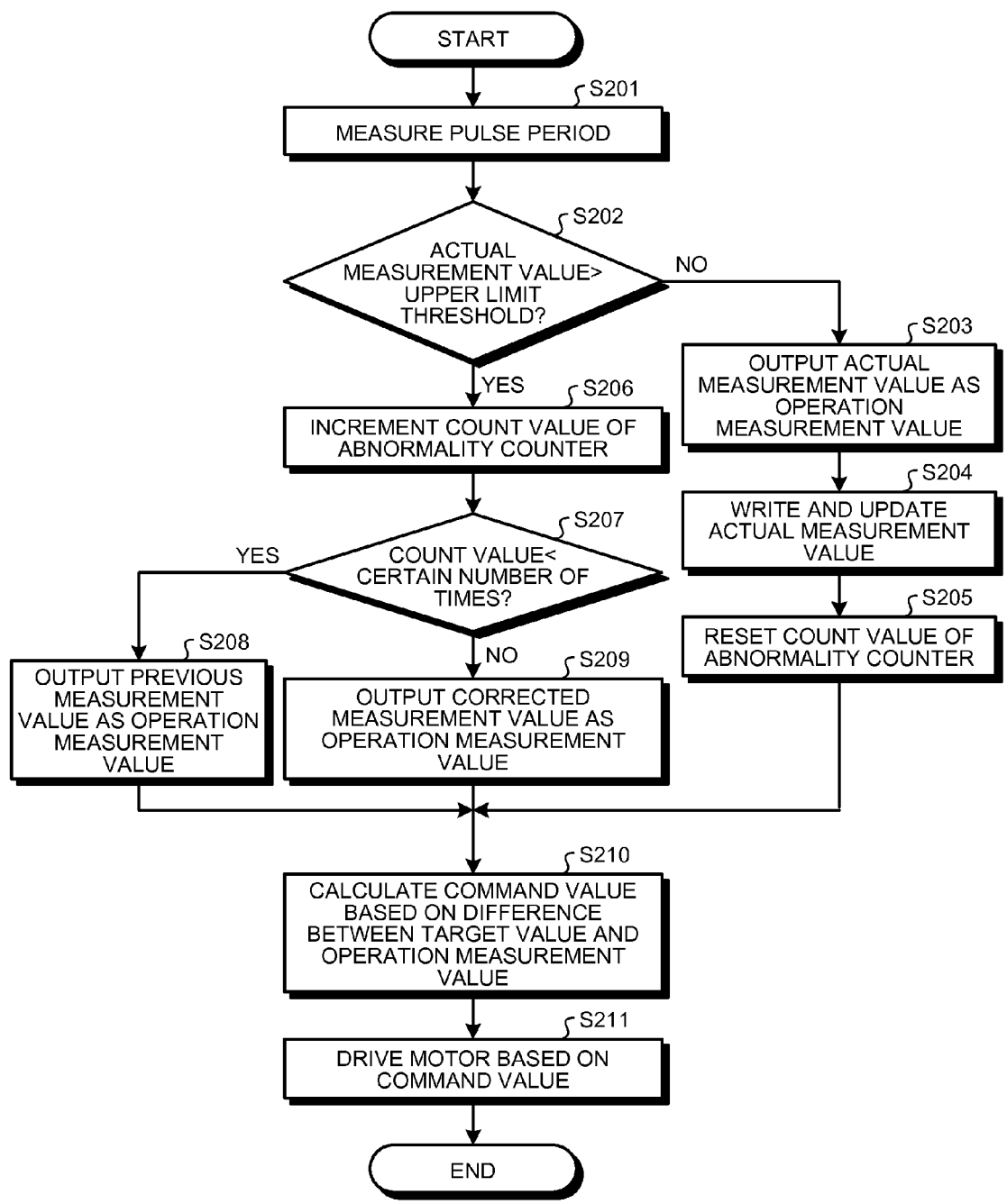
FIG. 9 is a flowchart illustrating control procedures of the motor control device in the first variation.

Next, control procedures performed by the motor control device 100 in the first modification are described with reference to FIG. 9. FIG. 9 is a flowchart illustrating the control procedures performed by the motor control device 100 in the first modification. A series of processes as illustrated in the flowchart in FIG. 9 are executed in the respective control cycles repeatedly.

When the process is started, first, the measuring unit 111 of the control IC 110 measures a period (pulse period) of a pulse signal that is output from the encoder 101 (step S201). The pulse period measured by the measuring unit 111 is input to the operation measurement value generator 112 as an actual measurement value.

Then, the operation measurement value generator 112 determines whether the actual measurement value input from the measuring unit 111 is higher than an upper limit threshold set as an abnormality determination threshold (step S202). If the actual measurement value is equal to or lower than the upper limit threshold (No at step S202), the operation measurement value generator 112 outputs the actual measurement value as an operation measurement value (step S203). Thereafter, the operation measurement value generator 112 writes the actual measurement value into the memory 102 and updates the previous measurement value stored in the memory 102 by the new actual measurement value (step S204). Furthermore, the operation measurement value generator 112 resets the count value of the abnormality counter 113 (step S205), and the process proceeds to step S210.

On the other hand, if the actual measurement value is determined to be higher than the upper limit threshold at step S202 (Yes at step S202), the operation measurement value generator 112 increments the count value of the abnormality counter 113 (step S206), and then, determines whether the count value is smaller than the certain number of times (step S207). If the count value of the abnormality counter 113 is smaller than the certain number of times (Yes at step S207), the operation measurement value generator 112 outputs the previous measurement value stored in the memory 102 as an operation measurement value (step S208), and the process proceeds to step S210. On the other hand, if the count value of the abnormality counter 113 reaches the certain number of times (No at step S207), the operation measurement value generator 112 outputs the corrected measurement value as an operation measurement value (step S209), and the process proceeds to step S210.

Subsequently, the control operation unit 114 calculates a command value for controlling driving of the motor M based on the different between the target value corresponding to the target speed of the motor M and the operation measurement value that is output from the operation measurement value generator 112 at step S203, step S208, or step S209 (step S210). Then, the driving circuit 103 drives the motor M based on the command value from the control operation unit 114 (step S211), and a series of processes in the control cycle are finished.

As described above, the motor control device 100 according to the first modification sets the upper limit threshold that is higher than the target value as the abnormality determination threshold. Furthermore, the motor control device 100 according to the first modification sets the previous measurement value stored in the memory 102 as the operation measurement value until the number of times that the actual measurement value is higher than the upper limit threshold successively reaches the certain number of times. When the number of times that the actual measurement value is higher than the upper limit threshold successively reaches the certain number of times, the motor control device 100 according to the first modification sets the corrected measurement value higher than the target value as the operation measurement value. Then, the motor control device 100 according to the first modification calculates the command value for controlling driving of the motor M based on the difference between the target value and the operation measurement value. Accordingly, even when the drastic change in the speed of the motor M occurs, the motor M can be controlled stably while suppressing the control abnormality due to the pulse missing effectively.

SECOND MODIFICATION

The following describes, as a second modification, the example in which two abnormality determination thresholds including the lower limit threshold lower than the target value and the upper limit threshold higher than the target value are set. In the second modification, when the actual measurement value is lower than the lower limit threshold or higher than the upper limit threshold, the operation measurement value generator 112 of the control IC 110 determines that the actual measurement value exceeds the abnormality determination threshold. On the other hand, when the actual measurement value is equal to or higher than the lower limit threshold and equal to or lower than the upper limit threshold, the operation measurement value generator 112 of the control IC 110 determines that the actual measurement value does not exceed the abnormality determination threshold. It should be noted that the configuration and the basic control method of the motor control device 100 are the same as those in the above-mentioned embodiment.

Figure 10:
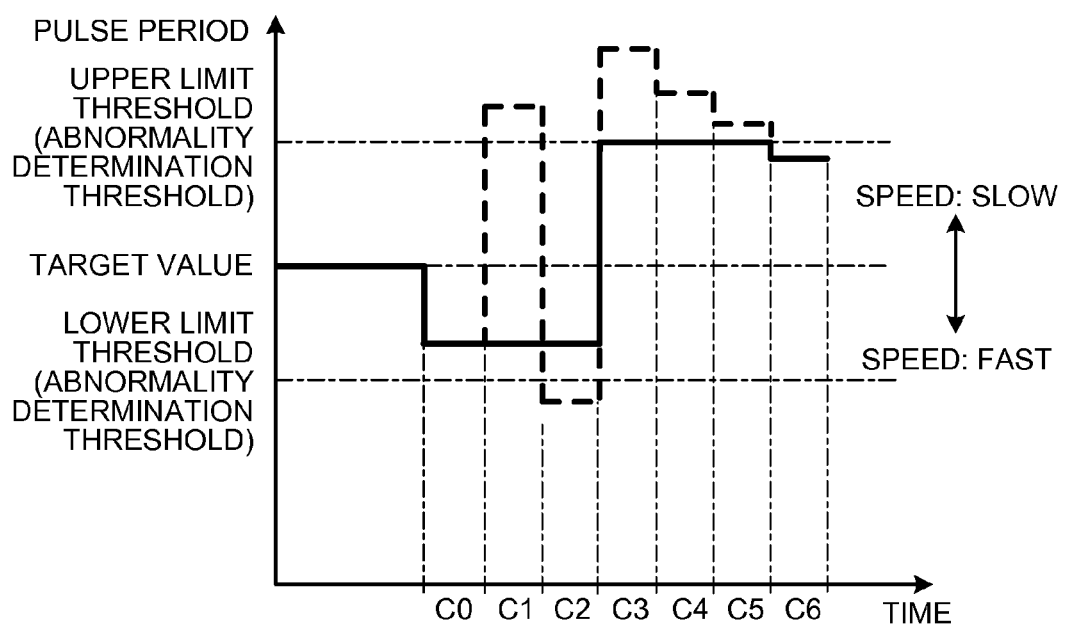
FIG. 10 is a graph illustrating time change of an operation measurement value that is output from an operation measurement value generator of a motor control device according to a second variation.

FIG. 10 is a graph illustrating time change of the operation measurement value that is output from the operation measurement value generator 112 of the motor control device 100 according to the second modification. The example of FIG. 10 assumes the case where the actual measurement value that is lower than the target value at a control cycle C0 becomes higher than the upper limit threshold set as the abnormality determination threshold at the subsequent control cycle C1 due to drastic change in the speed of the motor M (decrease in the rotation speed) as in the example of FIG. 8. Although FIG. 10 illustrates the example in which the upper limit threshold itself set as the abnormality determination threshold is used as the corrected measurement value as in the example of FIG. 8, the corrected measurement value may be a value different from the abnormality determination threshold. The graph as indicated by a dashed line in FIG. 10 indicates the time change of the actual measurement value and the graph as indicated by a solid line in FIG. 10 indicates the time change of the operation measurement value. The longitudinal axis in FIG. 10 indicates the length of the pulse period and the lateral axis indicates time.

As illustrated in FIG. 10, in the motor control device 100 according to the second modification, when the actual measurement value measured at the control cycle C1 is higher than the upper limit threshold (exceeds the abnormality determination threshold) due to the drastic change in the speed of the motor M, the operation measurement value generator 112 outputs the previous measurement value measured at the previous control cycle C0 as the operation measurement value. In this case, the count value of the abnormality counter 113 is incremented.

In the example of FIG. 10, thereafter, although the actual measurement value is lower than the lower limit threshold temporarily at a control cycle C2 due to the noise superimposition and the chattering, the actual measurement value becomes higher than the upper limit threshold again at a subsequent control cycle C3. In the motor control device 100 according to the second modification, every time the actual measurement value exceeds the abnormality determination threshold, that is, every time the actual measurement value is higher than the upper limit threshold or is lower than the lower limit threshold, the count value of the abnormality counter 113 is incremented. Then, the operation measurement value generator 112 outputs the previous measurement value measured at the control cycle C0 as the operation measurement value until the count value of the abnormality counter 113 reaches a certain number of times (three times in the example of FIG. 10). When the count value of the abnormality counter 113 reaches the certain number of times, the operation measurement value generator 112 outputs the corrected measurement value as the operation measurement value. In the second modification, the operation measurement value generator 112 sets, as the corrected measurement value, the value set in the same direction as the direction in which the abnormality determination threshold is set. Specifically, when the actual measurement value exceeds first the upper limit threshold that is set as the abnormality determination threshold in a positive direction, the operation measurement value generator 112 sets, as the corrected measurement value, the value set in the positive direction (in this example, the upper limit threshold).

On the other hand, when the actual measurement value exceeds first the lower limit threshold that is set as the abnormality determination threshold in a negative direction, the operation measurement value generator 112 sets, as the corrected measurement value, the value set in the negative direction (in this example, the lower limit threshold).

In the example of FIG. 10, at the control cycle C2, the count value of the abnormality counter 113 is twice and does not reach three times as the certain number of times, so that the operation measurement value generator 112 outputs the previous measurement value measured at the control cycle C0 as the operation measurement value. At the subsequent control cycle C3, the count value of the abnormality counter 113 reaches three times as the certain number of times, so that the operation measurement value generator 112 outputs, as the operation measurement value, the corrected measurement value (in this example, upper limit threshold). In this case, the actual measurement value first exceeds at the control cycle C1 the upper limit threshold being set in the positive direction. Therefore, the operation measurement value generator 112 outputs, as the operation measurement value, the corrected measurement value (in this example, the lower limit threshold) being set in the positive direction. The corrected measurement value is a value higher than the target value. Accordingly, when the corrected measurement value is output as the operation measurement value, the command value that is calculated based on the difference between the target value and the operation measurement value is a command value for increasing the speed of the motor M.

Thereafter, although the actual measurement values at a control cycle C4 and a control cycle C5 are higher than the upper limit threshold, the operation measurement value generator 112 outputs the corrected measurement value (upper limit threshold) as the operation measurement value because the count value of the abnormality counter 113 has already reached three times. As a result, the command value for increasing the speed of the motor M is continuously input to the driving circuit 103. With this, the actual measurement value gradually makes closer to the target value. Then, the actual measurement value is equal to or lower than the upper limit threshold at a control cycle C6, so that the operation measurement value generator 112 outputs the actual measurement value as the operation measurement value and resets the count value of the abnormality counter 113. Thereafter, the command value is calculated based on the difference between the target value and the actual measurement value, and the speed of the motor M converges to the target speed.

Figure 11:
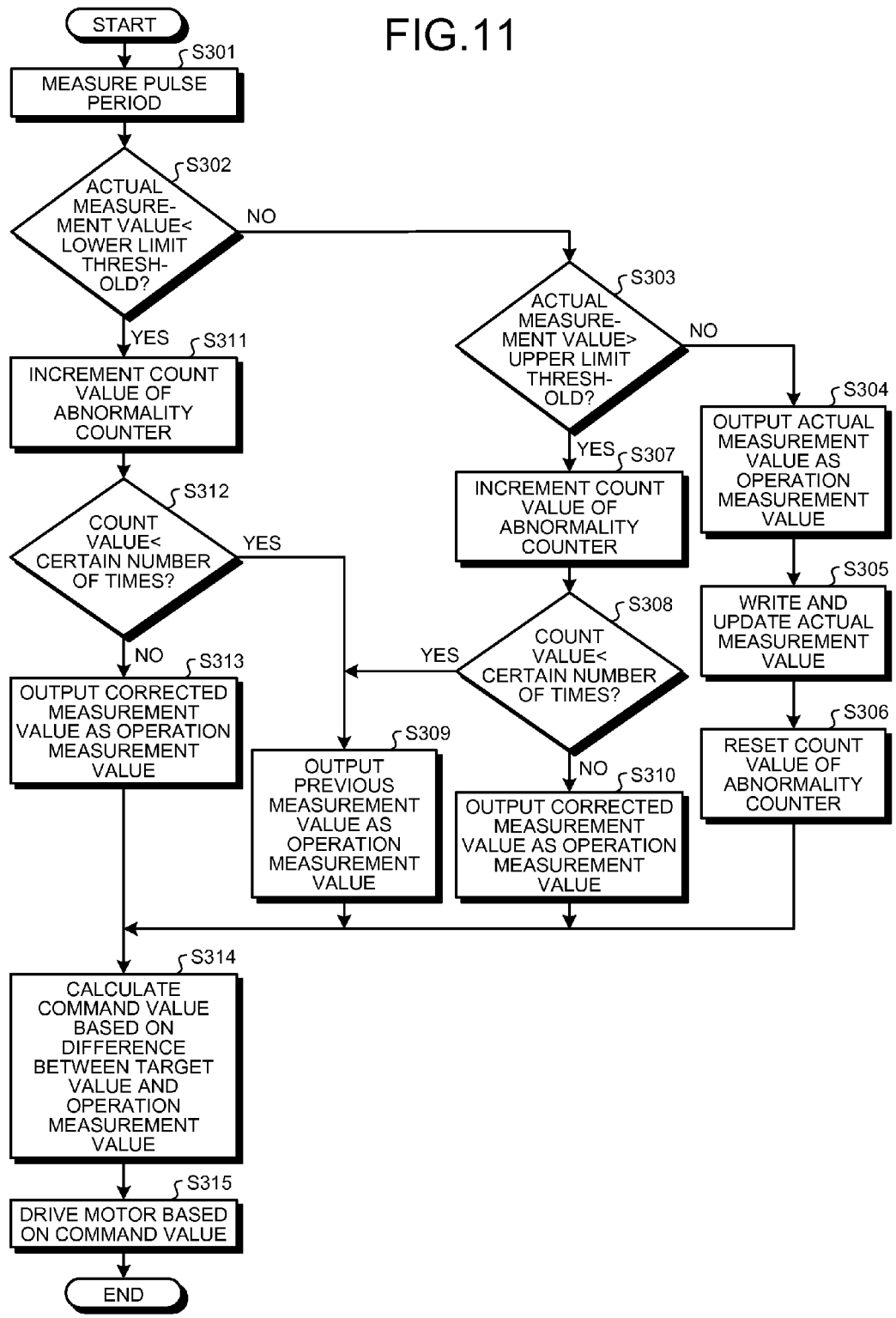
FIG. 11 is a flowchart illustrating control procedures of the motor control device in the second variation.

Next, control procedures performed by the motor control device 100 according to the second modification are described with reference to FIG. 11. FIG. 11 is a flowchart illustrating the control procedures performed by the motor control device 100 in the second modification. A series of processes as illustrated in the flowchart in FIG. 11 are executed in the respective control cycles repeatedly.

When the process is started, first, the measuring unit 111 of the control IC 110 measures a period (pulse period) of a pulse signal that is output from the encoder 101 (step S301). The pulse period measured by the measuring unit 111 is input to the operation measurement value generator 112 as an actual measurement value.

Then, the operation measurement value generator 112 determines whether the actual measurement value input from the measuring unit 111 is lower than a lower limit threshold (step S302). If the actual measurement value is equal to or higher than the lower limit threshold (No at step S302), the operation measurement value generator 112 further determines whether the actual measurement value input from the measuring unit 111 is higher than an upper limit threshold (step S303). If the actual measurement value is equal to or lower than the upper limit threshold (No at step S303), the operation measurement value generator 112 outputs the actual measurement value as an operation measurement value (step S304). Thereafter, the operation measurement value generator 112 writes the actual measurement value into the memory 102 and updates the previous measurement value stored in the memory 102 by the new actual measurement value (step S305). Furthermore, the operation measurement value generator 112 resets the count value of the abnormality counter 113 (step S306), and the process proceeds to step S314.

On the other hand, if the actual measurement value is determined to be higher than the upper limit threshold at step S303 (Yes at step S303), the operation measurement value generator 112 increments the count value of the abnormality counter 113 (step S307), and then, determines whether the count value is smaller than the certain number of times (step S308). If the count value of the abnormality counter 113 is smaller than the certain number of times (Yes at step S308), the operation measurement value generator 112 outputs the previous measurement value stored in the memory 102 as an operation measurement value (step S309), and the process proceeds to step S314. On the other hand, if the count value of the abnormality counter 113 reaches the certain number of times (No at step S308), the operation measurement value generator 112 outputs the corrected measurement value as an operation measurement value (step S310), and the process proceeds to step S314.

Furthermore, if the actual measurement value is determined to be lower than the lower limit threshold at step S302 (Yes at step S302), the operation measurement value generator 112 increments the count value of the abnormality counter 113 (step S311), and then, determines whether the count value is smaller than the certain number of times (step S312). If the count value of the abnormality counter 113 is smaller than the certain number of times (Yes at step S312), the operation measurement value generator 112 outputs the previous measurement value stored in the memory 102 as an operation measurement value (step S309), and the process proceeds to step S314. On the other hand, if the count value of the abnormality counter 113 reaches the certain number of times (No at step S312), the operation measurement value generator 112 outputs the corrected measurement value as an operation measurement value (step S313), and the process proceeds to step S314.

Subsequently, the control operation unit 114 calculates a command value for controlling driving of the motor M based on the different between the target value corresponding to the target speed of the motor M and the operation measurement value that is output from the operation measurement value generator 112 at step S304, step S309, step S310, or step S313 (step S314). Then, the driving circuit 103 drives the motor M based on the command value from the control operation unit 114 (step S315), and a series of processes in the control cycle are finished.

As described above, the motor control device 100 according to the second modification sets the two abnormality determination thresholds including the lower limit threshold and the upper limit threshold. Furthermore, the motor control device 100 according to the second modification sets the previous measurement value stored in the memory 102 as the operation measurement value until the number of times that the actual measurement value exceeds the abnormality determination threshold successively reaches the certain number of times. When the number of times that the actual measurement value exceeds the abnormality determination threshold successively reaches the certain number of times, the motor control device 100 according to the second modification sets the corrected measurement value as the operation measurement value. Then, the motor control device 100 according to the second modification calculates a command value for controlling driving of the motor M based on the difference between the target value and the operation measurement value. Accordingly, even when the drastic change in the speed of the motor M occurs, the motor M can be controlled stably while suppressing both of the control abnormality due to noise and chattering and the control abnormality due to pulse missing.

In the above-mentioned description, one abnormality counter 113 counts the number of times that the actual measurement value is larger than the upper limit threshold and is lower than the lower limit threshold. Alternatively, the abnormality counters 113 of two types for the upper limit threshold and the lower limit threshold may be used. It should be noted that when only one abnormality counter 113 is provided, vibration of the motor M can be detected faster and it is effective.

In the motor control device 100 according to the embodiment, for example, the control IC 110 executes predetermined control programs so as to execute the functions of the respective units (the measuring unit 111, the operation measurement value generator 112, the abnormality counter 113, and the control operation unit 114) of the control IC 110. For example, the control IC 110 includes basic constituent components constituting a computer, such as a central processing unit (CPU), a random access memory (RAM), a read only memory (ROM), and an input/output interface (IF) and the CPU executes programs embedded and provided in the ROM previously while using the RAM as a work area so as to execute the functions of the above-mentioned respective units. The programs that are executed by the CPU of the control IC 110 may be recorded and provided in a computer-readable recording medium such as a compact disc read only memory (CD-ROM), a flexible disk (FD), a compact disc recordable (CD-R), and a digital versatile disc (DVD), as an installable or executable file.

The control programs that are executed by the CPU of the control IC 110 may be stored in a computer connected to a network such as the Internet and provided by being downloaded via the network. Furthermore, the control programs that are executed by the CPU of the control IC 110 may be provided or distributed via a network such as the Internet.

The control programs that are executed by the CPU of the control IC 110 has a module structure including the measuring unit 111, the operation measurement value generator 112, the abnormality counter 113, and the control operation unit 114 as described above. As actual hardware, for example, the CPU reads and executes the control programs from the ROM, so that the above-mentioned respective parts are loaded on the RAM to be generated on the RAM.

In the above-mentioned embodiment and modifications, although the period (pulse period) of the pulse signal that is output from the encoder 101 is measured as the measurement value corresponding to the rotation speed of the motor M based on the configuration using the encoder 101 the measurement value corresponding to the rotation speed of the motor M is not limited to the pulse period. For example, when the rotation speed of the motor M is detected by another method using a Hall element or a resolver, for example, it is sufficient that a value in accordance with the configuration is measured.

Furthermore, when the number of times that the actual measurement value exceeds the abnormality determination threshold successively reaches the certain number of times, the abnormality determination threshold is used as the operation measurement value in the above-mentioned embodiment and modifications. Alternatively, a corrected measurement value other than the abnormality determination threshold can be used as the operation measurement value. For example, when the abnormality determination threshold is set as the lower limit threshold, a corrected measurement value that is lower than the target value and is different from the lower limit threshold may be used as the operation measurement value. Furthermore, when the abnormality determination threshold is set as the upper limit threshold, a corrected measurement value that is higher than the target value and is different from the upper limit threshold may be used as the operation measurement value.

Although the image forming apparatus 1 configured as the tandem color copying machine of the intermediate transfer system is employed as an example of the image forming apparatus to which the present invention can be applied in the above-mentioned embodiments, the present invention can be widely applied to image forming apparatuses of various types. In addition, the present invention is not limited to the image forming apparatuses and can be widely applied to apparatuses including the motor required to rotate at the constant speed.

The present invention can provide an effect that the motor can be controlled stably.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:
1. A motor control device comprising:
a measuring unit configured to output a measurement value corresponding to a rotation speed of a motor; and
a control unit configured to control driving of the motor such that the measurement value makes closer to a target value, the target value being between a lower limit threshold and an upper limit threshold, wherein the control unit is configured to:
when the measurement value is between the lower limit threshold and the upper limit threshold, control the driving of the motor based on a difference between the measurement value and the target value,
when the measurement value is lower than the lower limit threshold, control the driving of the motor based on a difference between a corrected measurement value and the target value, the corrected measurement value being set to a value lower than the target value, and
when the measurement value exceeds the upper limit threshold, control the driving of the motor based on a difference between a corrected measurement value and the target value, the corrected measurement value being set to a value higher than the target value.
2. The motor control device according to claim 1, further comprising a counter configured to count the number of times that the measurement value is successively lower than the lower limit threshold or is successively higher than the upper limit threshold, wherein the control unit is configured to:
until the number of times counted by the counter reaches a certain number of times, control the driving of the motor based on a difference between a previous measurement value and the target value, the previous measurement value having been output immediately before the measured value was outside of a range bounded by the lower limit threshold and upper limit threshold, and
after the number of times counted by the counter reaches the certain number of times, control the driving of the motor based on a difference between the corrected measurement value and the target value.

3. The motor control device according to claim 2, wherein the control unit is configured to:
when the measurement value is lower than the lower limit threshold or when the measurement value is higher than the upper limit threshold,
after the number of times reaches the certain number of times, control the driving of the motor based on a difference between the corrected measurement value and the target value.

4. The motor control device according to claim 1, wherein the control unit is configured to selectively set the lower limit threshold and the upper limit threshold as the corrected measurement value.

5. The motor control device according to claim 1, further comprising an encoder configured to output a pulse signal in synchronization with rotation of the motor, wherein the measuring unit is configured to measure and output a pulse period of the pulse signal as the measurement value corresponding to the rotation speed of the motor.

6. An image forming apparatus comprising:
a motor for use in image formation; and
the motor control device according to claim 1.

7. A motor control method comprising:
outputting a measurement value corresponding to a rotation speed of a motor; and
controlling driving of the motor such that the measurement value makes closer to a target value, the target value being between a lower limit threshold and an upper limit threshold, wherein
the controlling includes
controlling, when the measurement value is between the lower limit threshold and the upper limit threshold, the driving of the motor based on a difference between the measurement value and the target value,
controlling, when the measurement value is lower than the lower limit threshold, the driving of the motor based on a difference between a corrected measurement value and the target value, the corrected measurement value being set to a value lower than the target value, and
controlling, when the measurement value exceeds the upper limit threshold, the driving of the motor based on a difference between a corrected measurement value and the target value, the corrected measurement value being set to a value higher than the target value.

* * * * *